United States Patent [19]

Schneider et al.

[11] 4,232,575
[45] Nov. 11, 1980

[54] ARRANGEMENT FOR PUNCHING OUT CIRCULAR BLANKS

[75] Inventors: Franz Schneider; Helmut Braitinger, both of Göppingen; Ewald Bergmann, Rechberghausen; Otto Kurz, Hattenhofen, all of Fed. Rep. of Germany

[73] Assignee: L. Schuler GmbH, Fed. Rep. of Germany

[21] Appl. No.: 961,246

[22] Filed: Nov. 16, 1978

[30] Foreign Application Priority Data

Nov. 16, 1977 [DE] Fed. Rep. of Germany ....... 2751123

[51] Int. Cl.$^3$ ............................................. B21D 28/22
[52] U.S. Cl. ........................................... 83/71; 83/79; 83/154; 83/267; 83/405; 83/411 R; 83/560; 83/917
[58] Field of Search ............... 83/71, 411 R, 405, 560, 83/917, 63, 94, 154, 267, 733, 79

[56] References Cited

U.S. PATENT DOCUMENTS

| 3,460,415 | 8/1969 | Philipp | 83/411 R |
| 3,603,191 | 9/1969 | Muller | 83/405 |
| 3,623,385 | 12/1969 | Schneider et al. | 83/405 X |
| 3,706,249 | 12/1972 | Bruckner | 83/411 R X |
| 3,835,744 | 9/1974 | Wendt | 83/560 X |
| 3,890,863 | 6/1975 | Reihle | 83/411 R X |

FOREIGN PATENT DOCUMENTS 2206330  8/1973  Fed. Rep. of Germany ............ 83/917

Primary Examiner—J. M. Meister
Attorney, Agent, or Firm—Craig and Antonelli

[57] ABSTRACT

An arrangement for notching or slotting circular blanks so as to produce stacks of rotor and/or stator laminations for electric machines. At least one slotting machine is provided which in a first direction is adjustable radially with respect to a spatially fixed axis of rotation of a blank support table by way of a separate adjusting drive. The support table for the blanks, constructed as an indexing apparatus, may be driven by a numerically controlled adjusting drive. The at least one slotting machine is movable in a second direction at right angles to the first direction by way of a further adjusting drive. The stacks of lamination produced by the punching arrangement may include spiral slots or notches as well as oblique slots or notches enabling the production of special motors having a cone or tapered armature.

17 Claims, 3 Drawing Figures

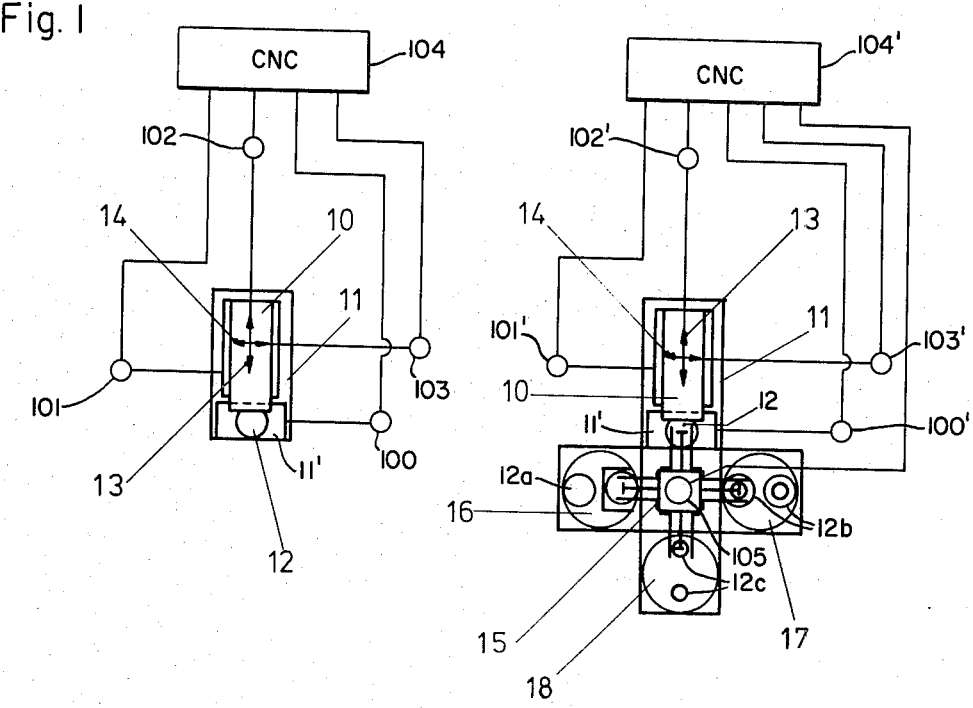

ARRANGEMENT FOR PUNCHING OUT CIRCULAR BLANKS

The present invention relates to a punching or notching arrangement and, more particularly, to punching or notching out circular blanks utilized for rotor and/or stator laminations of electrical machines with the arrangement including at least one slotting or notching machine adjustable in a first direction of movement radially with respect to a spatially fixed axis of rotation of a blank support table with an additional special adjusting drive being provided for adjusting the slotting or notching machine in a second direction.

An arrangement for punching out circular laminations for cone armature motors is proposed in, for example, Offenlegungsschrift No. 2,154,003, wherein a slotting machine is provided and disposed so as to be moved radially with respect to an axis of rotation of a blank supporting table by means of a separate adjusting drive in order to insure that the diameters of the circular laminations are matched for each blank.

In German Patentschrift No. 1,627,227, a numerically controlled segment slotter is proposed wherein the rotational axis of the blank support table is movable radially with respect to a center of rotation of such rotational axis in two directions at right angles to each other.

German Patentschrift No. 21,08,231 also proposes a numerically controlled segment slotter; however, the axis of rotation of the blank support table is shifted away from the blank support table in a direction toward the slotting machine or, more exactly, shifted away into the area of a punch tool.

Additionally, in Auslegeschrift No. 24,11,439, a numerically controlled segment slotter is proposed in which the rotational axis of the blank support table is movable in one direction with the slotting machine itself being movable in another direction at right angles to the rotational axis of the blank support table.

In the three last mentioned slotting machines, the slotted stator and rotor laminations are in the form of circular ring-shaped segments for relatively large electrical machines with the adjustment drive of these machines being actuated for each slotting process.

A disadvantage of the proposed segment slotting machines resides in the fact that such machines are not suited for the production of stacks of rotor and/or stator laminations which are slotted from circular blanks since no customary automation arrangements can be applied to the known numerically controlled slotting machines for laminations which are formed as circular blanks.

Moreover, a further disadvantage of the proposed arrangements resides in the fact that the adjusting drives are constructed such that all adjusting drives are actuated for each ram stroke, that is, with each slotting process.

The aim underlying the present invention essentially resides in providing an automatic arrangement for punching out or slotting circular blanks so as to form stator and/or rotor laminations by way of a conventional slotting machine thereby producing stacks of laminations for electric motors which may have spiral or oblique slots.

According to the present invention, at least one slotting or notching machine is provided at which is arranged a rotatably driven support table for supporting the blanks to be slotted or notched. The slotting or notching machine is driven by an adjustable drive means in one direction of movement which is radial with respect to the axis of rotation of the support table and in a second direction of movement, by a separate adjustable drive, at right angles to the first direction of movement.

According to a further feature of the present invention, the at least one slotting or notching machine is provided with a tool carrier which is adjustable or displaceable in the second direction of movement.

To achieve a completely automatic processing of the blanks, at least one automatic feeding and/or removing device is associated with the at least one slotting or notch machine. The feeding and/or removing device may be constructed as an indexing spider which functions to deliver unslotted blanks from a destacking station to the slotting or notching machine, at which the blank is processed, and then to deliver the processed blank to either a stator and/or rotor lamination stacking station.

To insure accurate high performance operation of the punching arrangement of the present invention and to provide for an economical production of the stator and/or rotor laminations, a control means is provided for controlling the adjusting drive means of the slotting or notching machine, support table for the blanks, as well as the feeding and removing device. The control means is preferably constructed as a numerical control system which may also be employed to control the position of the tool carrier.

In accordance with yet another feature of the present invention, the support table for the circular blanks indexes or turns the blank, conveyed or delivered to the support table in a predetermined initial position, by a predetermined preselectable angle before a slotting or notching takes place with the indexing of the table being cumulative or additive from blank to blank. For this purpose, the numerical control system may be operatively connected to the adjusting drive means for the support table.

Moreover, according to the present invention, the numerical control system may move or displace the slotting machine in the second direction of movement by a predetermined preselectable distance which may be cumulative from blank to blank with the movement or displacement of the slotting machine being effected between slotting or notching steps and/or prior to the feeding of the blank onto the support table by the feeding and removing device.

To permit a further processing of the notched or slotted blanks, according to the present invention, at least one additional slotting or notching machine may be provided to which the laminations processed by the first slotting or notching machine may be conveyed by a feeding and removing device with the additional slotting or notching machine carrying out further processing steps on the stator and/or rotor laminations.

To facilitate handling of the processed stator and/or rotor laminations, the processed laminations may be fed by the feeding and removing device to stator and rotor lamination stacking stations which may be provided with pivotally mounted change magazines for accommodating the processed laminations. The change magazines may be indexed with each blank so as to position the laminations thereon with a preselected disposition of the notches. Moreover, the provision of change magazines at the stacking stations permits stacked laminations to be removed and blanks to be reloaded during a running production. If desired, a suitable switching means may be provided for automatically stopping production upon one of the stacking stations being emptied or being filled by blanks or processed laminations.

One advantage of the punching arrangement of the present invention resides in the fact that an automatic numerically controlled production of stacks of laminations with spiral or oblique notches or slots and/or variable slot shapes for electric devices such as, for example, electric motors, may be obtained utilizing generally conventional feeding and removing devices.

Another advantage of the present invention resides in the fact that the adjusting drives for resetting the slotting or notching machines can be constructed in a relatively simple manner since the adjusting steps to be effected by the adjusting drives need only be actuated once with each lamination to be slotted or notched.

An additional advantage of the present invention resides in the fact that by virtue of the numerical control of the production of the stacks of laminations, the possibility exists of operatively connecting the punching arrangement with a central process computer at a higher level.

Accordingly, it is an object of the present invention to provide a notching or slotting arrangement for circular blanks which avoids, by simple means, shortcomings and disadvantages encountered in the prior art.

Another object of the present invention resides in providing a slotting or notching arrangement having a high slotting or notching performance and a low maintenance requirement so as to insure an economical production of stator and/or rotor laminations.

A still further object of the present invention resides in providing a punching arrangement for circular blanks which functions reliably under all operating conditions.

These and other objects, features, and advantages of the present invention will become more apparent from the following description when taken in connection with the accompanying drawings which show, for the purposes of illustration only, several embodiments in accordance with the present invention, and wherein:

FIG. 1 is a schematic plan view of a first embodiment of a punching arrangement in accordance with the present invention;

FIG. 2 is a schematic plan view of a second embodiment of a punching arrangement in accordance with the present invention operatively associated with a four-armed feeding and removal means; and FIG. 3 is a schematic plan view of a further embodiment of a punching arrangement in accordance with the present invention operatively associated with a six-armed feeding and removal means.

Referring now to the drawings wherein like reference numerals are used throughout the various views to designate like parts and, more particularly, to FIG. 1 which illustrates the simplest arrangement of the present invention, according to this figure, a notching or slotting machine 10 is supported on a bench 11 and is provided with a support table 11' for supporting blanks 12. The support table 11' is driven, in a conventional manner, by a separate adjusting drive means 100 and there is no kinematic connection between the main drive 101 of the notching machine 10 and the adjusting drive means for the support table 11'. The notching machine 10 is adjustable radially with respect to the support table 11' in a first direction of movement designated by the reference numeral 13 by means of a conventional adjusting drive 102 with a further conventional adjusting drive 103 providing for an adjustment of the notching machine 10 in a second direction of movement designated by the reference numeral 14 which is at right angles to the first direction of movement 13.

The arrangement of FIG. 2 is the same in principle as that shown in FIG. 1 with a slotting machine 10, a bench 11 and a support table 11' being provided for supporting the blanks 12. As with the arrangement of FIG. 1, the notching machine 10 of FIG. 2 may also be moved in the two directions of movement 13, 14 at right angles to each other. Additionally, a four-armed feeding and removal device 15 constructed as an indexing spider is provided for automatically feeding and removing the blanks 12 to and from the slotting machine 10.

The four-armed feeding and removing device 15 is adapted to remove unslotted blanks 12a from a destacking station 16, align the unslotted blanks 12a and transfer or feed the aligned unslotted blanks 12a to the support table 11'. To effect a transport of the unslotted blanks 12a, the four-armed feeding and removing device 15 is indexed or rotated by conventional means 105 through an angle of 90° each time an unslotted blank 12a is to be transported to and from the support table 11'. The indexing or rotating means 105 of the feeding and removing device 15 may be constructed as a cam controlled drive which enables a shock free acceleration for exactly defined transfer pitches at high cycle sequences. At the support table 11', the notching machine 10 is operated so that a slotted stator lamination is produced and separated from the remaining unslotted rotor lamination. The feeding and removing device 15 is then indexed during the further course of processing so that the slotted stator lamination 12b is transferred or conveyed by the feeding and removing device 15 to a stator stacking station 17 and stacked there while the remaining unslotted rotor 12c is conveyed or transported by the feeding and removal device 15 to a rotor stacking station 18 and stacked there. The respective stacking stations may be provided with conventional stacking mandrels (not shown) and, for the purpose of removing the stacked blanks or stacking the processed laminations at the respective stacking stations, the feeding and removing device may be provided in a conventional manner with magnetic means whereby the blanks or laminations can be individually transported.

For the purpose of notching the stator lamination and separating the same from the remaining unslotted rotor lamination, a conventional separating and notching tool (not shown) such as, for example, a centering ring may be provided at the notching machine 10. The notches are stamped in the stator with the notching tool and at the same time the rotor is separated from the stator by way of a staggered separating tool. The tool is generally fixed on the press ram and on a press table of the slotting machine.

As shown in FIG. 3, two notching machines 10, 10' may be provided with each having a bench 11, 11a and one support table 11', 11" for blanks 12, 12c. A six-armed feeding and removing device 19 also constructed as an indexing spider is provided for conveying or transferring the blanks 12, 12a, 12b, 12c between the slotting machines 10, 10' and the aligning and/stacking stations.

The six-armed feeding and removing device 19 removes an unslotted blank 12a from the destacking stations 16 and transfers such blank to an alignment station 21 of conventional construction wherein the blanks 12a are automatically oriented prior to a first notching operation. In order to overcome one-sided material thickness tolerances, the blanks 12a can be alternately turned by 180°. The blank 12a is then transported or conveyed by the feeding and removing device 19 to the support table 11' whereat a stator lamination is slotted or notched and separated from the rotor lamination by conventional separating and notching tools (not shown). After the slotting or notching operation is completed, the stator lamination 12b is transferred or conveyed to the stator stacking station 17 and, upon a further indexing of the feeding and removing device 19, an additional step, the rotor laminations 12c will be transferred or conveyed to a support table 11'' at the second notching machine 10'. The rotor lamination 12c is then notched or slotted by the machine 10' and the feeding and removing device 19 subsequently indexed so as to transfer or convey the slotted or notched rotor 12c to the rotor stacking station 18. As with the construction of FIG. 2, the destacking station 16, stator stacking station 17 and rotor stacking station 18 may be constructed with changeable mandrel magazines so that it is possible to operate or continue the process without interruption.

A conventional control system 104, 104', 104'' which may be, for example, a numerical control (NC) or a continuous numerical control (CNC) may be utilized to control the arrangements of FIGS. 1-3. As apparent from FIG. 1, since a single slotting machine 10 is provided without any feeding and removing means for the respective blanks, the arrangement does not lend itself to a completely automated system but rather the blanks may be fed and removed by an operator. However, in the arrangements of FIGS. 2 and 3, by virtue of the automatic indexing of the feeding and removing devices 15, 19, a completely automatic processing system can be realized.

With the arrangement of FIG. 2, required or desired values for a stack of laminations to be slotted may be entered into a numerical control system 104'. The values may represent, for example, the diameter of an average slot circle, number of slots to be made in a lamination, slot shape, angle of obliqueness, angular displacement with respect to a spiral slotting, etc. The input information fed into the numerical control system 104' results in signals being generated which are then fed to the adjusting drive means 102', 103' of the notching machine 10 whereby the drive means moves the notching machine 10 predetermined distances in the directions of movements 13, 14 so that the machine 10 is positioned in a predetermined manner corresponding to the information fed into the numeric control system 104'.

If a simple stack of laminations is to be produced, the support table 11' is fed with an unslotted blank 12a by the four-armed feeding and removal device 15. The unslotted blank 12a is moved into a predetermined specifiable initial position for the first notch or slot by means of the adjusting drive means 100'. The slotting of the blank 12a then proceeds in a conventional manner so as to produce a slot having a desired shape.

At the end of the slotting or notching process, it is reasonable and practical to separate the slotted or notched stator lamination 12b from the unslotted or unnotched rotor lamination 12c in a conventional manner by way of separating and notching tools. The rotor lamination 12c and stator lamination 12b are then transferred to their respective stacking stations 18, 17 by the four-armed feeding and removing device 15 which, at the same time, feeds a new unslotted or unnotched blank 12a to the support table 11'.

If, for example, a stator lamination 12b is to be provided with a preselected oblique slotting or notching, the first stator lamination 12b is obtained in the manner described hereinabove; however, with a second and all following stator laminations 12b, the adjusting drive 103' for the second direction of movement 14 is actuated during an indexing or conveying movement by the removing and feeding device 15 so that the slotting or notching machine 10 is displaced by a predetermined amount. After such movement, the notching or slotting process continues over the whole extent of the blank in the same manner and, for example, a displacement in the direction of movement 14 may continue prior to each slotting or notching step for the entire blank.

With a stack of laminations provided with a spiral slot or notch, the adjusting drive means for the support table 11' for the blanks 12 is additionally actuated with each blank so that a first slot or notch in each stator lamination is turned by a predetermined angle with respect to a preceding processed stator lamination.

FIG. 3 provides an example of the most expensive, but at the same time, most universal punching arrangement of the present invention. As shown in such figure, two slotting machines 10, 10' are provided with a six-armed feeding and removal device 19, constructed as an indexing spider, linking the slotting machines and stacking stations together. The arrangement of FIG. 3 produces stacks of rotor and stator laminations with oblique slots or notches, with spiral slots or notches, with symmetrical and asymmetrical slots or notch shapes, in cylinders or in cones. The numerical control system 104'' including the feeding and removal device 19 for handling of the unslotted blanks 12a as well as the completed stacks of rotor and stator laminations in an automated production may be coordinated by a central process computer operatively connected with the numerical control system.

It is also possible, in accordance with the present invention, in a manner not shown in great detail in the drawings, to provide a tool carrier at the at least one slotting machine 10, 10' which tool carrier can be moved in the second direction of movement 14 by way of, for example, a numerically controlled adjusting drive means. An advantage of arranging a tool carrier in such a manner resides in the fact that the tool carrier can be constructed as a changeable magazine for various tools thereby making it possible to, for example, exchange tools while one slotting or notching tool is actively engaged with the slotting machine 10, 10', that is, during the actual production process.

As can be appreciated, the punching arrangement of the present invention could be utilized to produce, for example, toothed gears, clutch disks, insulating plates for electric machines, filter disks, etc. in addition to stacks of rotor and/or stator laminations for electrical machines.

While we have shown and described several embodiments in accordance with the present invention, it is understood that the same is not limited thereto, but is susceptible of numerous changes and modifications as known to one having ordinary skill in the art, and we therefore do not wish to be limited to the details shown and described herein, but intend to cover all such modifications as are encompassed by the scope of the appended claims.

We claim:

1. An arrangement for notching circular blanks, the arrangement comprising at least one notching machine, a rotatably mounted table means for supporting the blanks at the notching machine, a feeding and removing means, and an adjusting drive means for adjusting the notching machine in a first direction of movement radially with respect to a spatially fixed axis of rotation of the supporting table means, characterized in that an additional adjusting means is provided for selectively driving the supporting table means, in that means are provided for enabling a relative movement between the supporting table means and the at least one notching machine in a second direction of movement at a right angle to the first direction of movement, and in that further means are provided for operating said feeding and removing device.

2. An arrangement according to claim 1, characterized in that said means for enabling a relative movement in a second direction includes a further adjusting drive means operatively connected with the at least one notching means for adjustably driving the machine in the second direction of movement at a right angle to the first direction of movement.

3. An arrangement according to claim 2, characterized in that said further adjusting drive means includes a numerical control means.

4. An arrangement according to claim 2, characterized in that a numerical control means is operatively connected to said further adjusting drive means for moving the at least one slotting machine in the second direction of movement by a preselectable distance prior to effecting a notching of the blank on the supporting table means.

5. An arrangement according to claim 4, characterized in that the at least one slotting means is moved by the preselectable distance with each blank being processed.

6. An arrangement according to claim 2, characterized in that said further adjustment means comprise indexing means.

7. An arrangement according to claim 6, characterized in that said indexing means is constructed as a cam controlled drive.

8. An arrangement according to claim 7, characterized in that stacking stations are provided wherein said blanks are stored both before and after their notching and in that switching means are provided for automatically stopping production upon one of the stacking stations being emptied or being filled by blanks.

9. An arrangement according to claim 8, characterized in that said feeding and removing device is provided with magnetic means whereby the blanks can be individually transported to and from said stacking stations.

10. An arrangement according to claim 1, characterized in that the at least one notching machine includes a tool carrier means, and in that said means for enabling a relative movement in the second direction includes a separate adjusting drive means operatively connected to the tool carrier means for adjustably driving the tool carrier means in the second direction of movement at a right angle to the first direction of movement.

11. An arrangement according to claim 3, characterized in that said separate adjusting drive means includes a numerical control means.

12. An arrangement according to one of claims 1, 2 or 10, characterized in that a numerical control means is operatively connected to said additional drive means for rotating a blank on said supporting table means from a predetermined initial position by a preselectable angle prior to effecting a notching of the blank.

13. An arrangement according to claim 12, characterized in that the supporting table means is rotated the preselectable angle with each blank being processed.

14. An arrangement according to claim 1, wherein processed circular blanks form rotor laminations and stator laminations, characterized in that a first means is provided for accommodating circular blanks to be processed, a second means is provided for accommodating stator laminations, and a third means is provided for accommodating rotor laminations, and in that said feeding and removing means conveys said blanks from said first means to the at least one notching machine and from said at least one notching machine to said stator lamination accommodating means and said rotor lamination accommodating means.

15. An arrangement according to claim 14, characterized in that said feeding and removing means is a selectively indexable four-armed conveying spider.

16. An arrangement according to claim 1, wherein processed circular blanks form rotor laminations and stator laminations, characterized in that at least two notching machines are provided, a first means is provided for accommodating blanks to be processed, a second means is provided for aligning unprocessed blanks, a third means is provided for accommodating stator laminations, and a fourth means is provided for accommodating rotor laminations, and in that said feeding and removing means conveys said blanks from said first means to said aligning means, to a first of said notching machines, to said stator lamination accommodating means, to a second of said notching machines, and to said rotor lamination accommodating means.

17. An arrangement according to claim 16, characterized in that said feeding and removing means is a selectively indexable six-armed conveying spider.

* * * * *